Nov. 20, 1923.
J. M. SWANSTROM
SHOCK ABSORBER
Filed Jan. 19, 1922
1,474,498
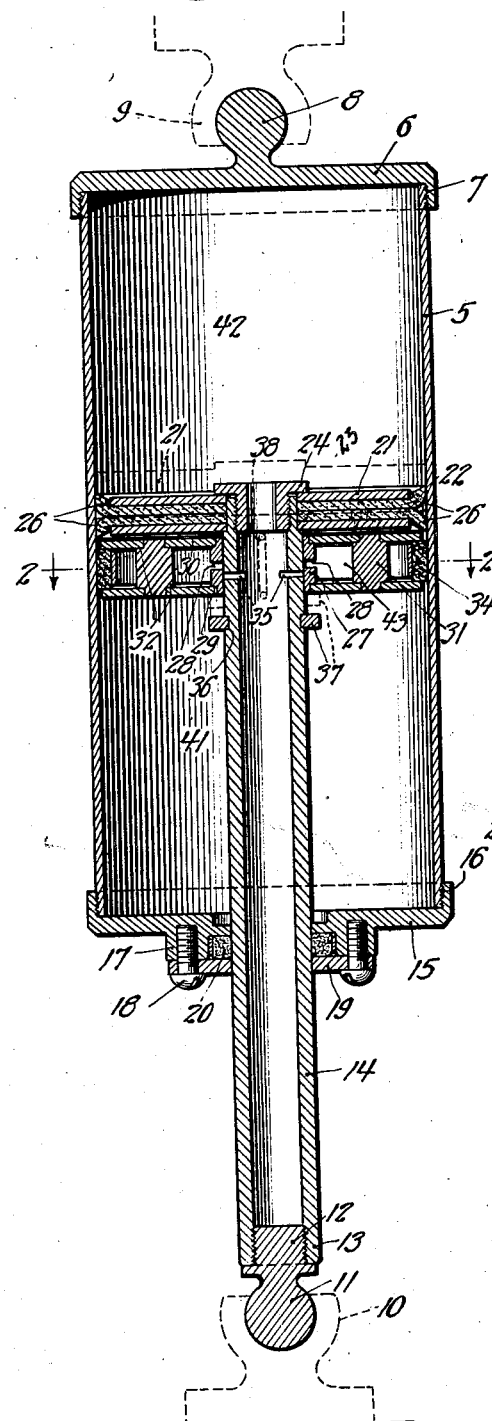
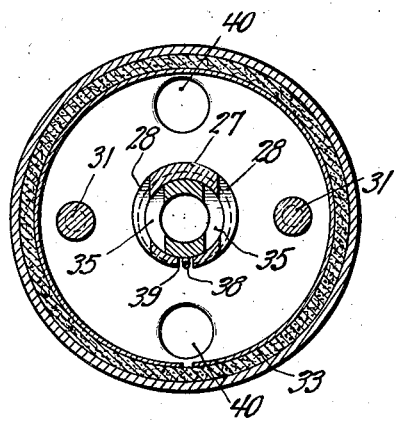
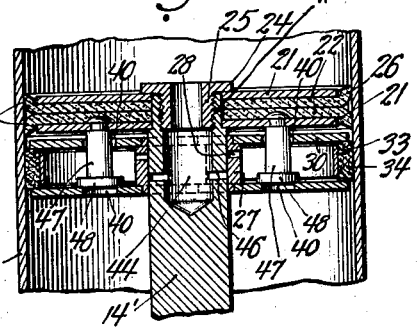
Inventor.
John M. Swanstrom
By: Gabel + Mueller
Attys Patented Nov. 20, 1923.

1,474,498

UNITED STATES PATENT OFFICE.

JOHN M. SWANSTROM, OF CHICAGO, ILLINOIS.

SHOCK ABSORBER.

Application filed January 19, 1922. Serial No. 530,316.

*To all whom it may concern:*

Be it known that I, JOHN M. SWANSTROM, a citizen of the United States, residing at Chicago, in the county of Cook and State of Illinois, have invented a certain new and useful Improvement in Shock Absorbers, of which the following is a full, clear, concise, and exact description, reference being had to the accompanying drawings, forming a part of this specification.

My invention relates to shock absorbers, and more particularly to a shock absorber using air for cushioning.

It is a purpose of the invention to provide a shock absorber which will reduce the rebound of the springs on a vehicle to the minimum by equalizing the pressure on both sides of the piston in the shock absorber immediately after the movement of the piston commences due to movement of the vehicle body relative to the axle.

It is a further purpose of the invention to provide a shock absorber comprising a tubular member which is closed at both ends, so as to seal the same to prevent escape of air therefrom, and a piston operating in said tubular member for compressing the air in said member alternately on one side of said piston and then on the other side, so as to reduce the oscillation of the vehicle body, as well as the axle, to a minimum due to the action of the springs.

In vehicles provided with springs the principal objection that arises due to the action of the springs is caused by the rebound of the body caused thereby. The present device cuts down the rebound due to the fact that means is provided for equalizing the pressure on opposite sides of the piston immediately after movement of the piston commences in a given direction. Ordinarily in a device having a piston operating in a cylinder, when the piston moves in one direction the air on one side of the piston is compressed and a partial vacuum results on the other side of the piston. Accordingly when rebound occurs, the compressed air on the first side of the piston and the vacuum on the other side of the piston will aid in bringing the parts back to their original position, and the resistance to the rebound action will be not only diminished but will be substantially reduced to nothing for the first part of the return movement of the piston.

More particularly it is a purpose of the invention to provide a shock absorber of the character set forth above with a piston having a valve member therein which operates to connect the spaces on opposite sides of the piston with each other after a small amount of movement of the piston takes place in either direction. Preferably the piston is provided with a compensating device comprising a valve member having a portion engaging the inner surface of the cylinder and having a limited movement relative to the piston proper, whereby when the piston moves in either direction the valve member will lag behind said piston to the extent allowed by the play of the valve member on the piston, said valve member being provided with ports which are adapted to register with ports in communication with the space on one side of the piston, and being provided with ports which communicate with the space on the other side of the piston, whereby the pressure on opposite sides of the piston is equalized when the said ports register with each other.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a longitudinal sectional view of the shock absorber showing the same connected to two members having movement relative to each other, such as a vehicle body and vehicle axle;

Fig. 2 is a section taken on the line 2—2 of Fig. 1; and

Fig. 3 is a fragmentary longitudinal sectional view of a modified form of piston structure.

Referring in detail to the drawings, the improved shock absorber comprises a cylindrical casing 5 provided with the cap 6 at one end thereof, secured thereto by the interengaging screw threads at 7, or in any other suitable manner, said cap 6 being provided with a ball member 8 which is adapted to engage with the socket member 9 which is provided on a vehicle body, or any other member having movement relative to a vehicle axle, or any other member upon which the socket member 10 is mounted, which is adapted to have the ball member 11 seated therein, said ball member 11 being provided with a screwthreaded portion 12 which is adapted to engage with the screwthreaded end portion 13 of the hollow piston rod 14. The hollow piston rod 14 passes through the cap member 15, which is screwthreadedly engaged with the casing 5 at 16, and which is provided with a raised angular rib 17 adapted to receive the screw 18 for holding the clamping ring 19 in position thereon to compress the packing ring 20 between the same and the cap 15 so as to provide an air tight joint about the hollow stem 14. The hollow stem or piston 14 is provided on the inner end thereof with a piston comprising the plates 21 of metal, between which the disks of leather or other flexible material 22 are clamped. The metal disks 21 are clamped between the shoulder 23 on the piston rod 14 and the flange 24 on the bushing 25 which is screwthreadedly engaged with the inner end portion of the rod 14. The members 22 are made of slightly greater diameter than the inner diameter of the casing 5, whereby the end portions 26 thereof are slightly bent over as shown in Fig. 1, so as to engage snugly with the inner surface of the casing 5.

Mounted on the hollow piston rod 14 is a valve member comprising the ring 27 having the slots 28 therein, and being provided with shoulders at 29 for engagement by the plates 30, whereby said plates are properly spaced at the inner edges thereof, said plates 30 being secured together by means of the studs 31 which are provided with shoulders thereon at 32 for spacing said plates outwardly from the inner edges thereof. Mounted between the plates 30 adjacent the outer peripheries thereof is the spring member 33 which is split as shown in Fig. 2, and which is distorted somewhat from its normal curvature so as to exert an outward pressure on the gasket 34 when the parts are in assembled relation within the casing 5, thus causing a snug engagement between the packing 34 and the casing 5. The hollow rod 14 is provided with a pair of slots 35 which are adapted to register with the slots 28 when the valve member slides on the rod 14. The rod is also provided with a peripheral groove 36 in which is mounted the split ring 37 which acts as a stop for limiting the movement of the valve member in one direction, the movement of the valve member being limited in the other direction by the plate 21 adjacent thereto.

Secured in the rod 14 in any suitable manner, as by stapling, is the wire 38 which serves as a guide member, which is adapted to operate in the slot 39 in the member 27 so as to prevent relative turning of the member 27 and the rod 14. The plates 30 are provided with openings 40 for allowing the air to pass from the chamber 41 on one side of the piston into the space 43 in the hollow valve member, or from said space into the space at 41. The operation of the device shown in Figs. 1 and 2 is as follows:

If the piston moves upwardly relative to the casing in Fig. 1, the air in the chamber 42 will be compressed and the air in the chamber 41 will be rarefied. Upon return movement of the piston downwardly relative to the casing 5, the hollow valve member will move from engagement with the ring 37 toward the plate 21 and the slots 35 will register with the slots 28 during this movement for a brief period of time. When the slots 28 and slots 35 register, the air compressed in the chamber 42 will pass through the slots into the chamber 41, this movement of the air taking place as long as the slots are in register, and as long as the pressure in the chambers 41 and 42 is not the same. As the downward movement of the piston continues, the air in the chamber 41 will be compressed and when the upward returning movement of the piston takes place the hollow valve member will move downwardly relative to the rod 14 until it engages with the ring 37, thus again bringing the slots 28 and 35 into register for a brief period of time and again equalizing the pressure on opposite sides of the piston. In Fig. 1 the outline of the piston is shown in dotted lines, as well as the outline of the ring 37, in order to show the relative position of the parts when the hollow valve member reaches the opposite end of its movement relative to the piston. In Fig. 3 is shown a slightly modified structure, in which the piston is constructed in the same manner as that shown in Fig. 1, and the cylinder or casing member 5 is also constructed in the same manner. The parts which are the same in said figure are provided with the same reference numerals as designate those parts in Fig. 1. The piston rod 14' is, however, shown as solid, except at the end portion thereof, said rod being provided with a bore 44 extending inwardly from the inner end thereof, and being provided with a screwthreaded portion 45 with which the member 25 is adapted to screwthreadedly engage. The member 14' is provided with slots 46 similar to the slots 35. The hollow valve member comprises the side plates 30 as shown in Fig. 1, the inner ring 27 having the slots 28 and the spring member 33 forcing the gasket 34 against the inner surface of the casing 5 also as in Fig. 1. The parts are held together in a similar manner as in Fig. 1, but instead of providing a ring member on the piston rod as in Fig. 1 to act as a stop for limiting the movement of the hollow valve member in one direction, the headed studs 47 having the heads 48 are provided in the openings 40 in one of the plates, the other openings 40 being used for establishing communication between the two chambers in a similar manner as described in connection with Fig. 1.

It will be evident upon reference to Fig. 3 that the heads 48 engaging with the inner face of one of the plates 30 will limit the movement of the valve in one direction, and the engagement of the head with the inner face of the opposite plate will limit the movement of the hollow valve member in the opposite direction.

It is believed that the description of the operation of Fig. 1, together with the description of Fig. 3, given above will be sufficient to make the operation of the device shown in Fig. 3 perfectly clear without further explanation.

Having thus described my invention, what I desire to claim and secure by U. S. Letters Patent is:

1. A shock absorber comprising an air tight cylinder, a piston in said cylinder and valve mechanism for equalizing the pressure of the air on opposite sides of said piston only at the initiation of movement of said piston in either direction.

2. A shock absorber comprising an air tight cylinder, a piston in said cylinder, a piston rod carrying said piston and valve mechanism mounted on said piston rod for establishing communication between the spaces on opposite sides of said piston for a limited period of time at the initiation of movement of said piston in either direction.

3. A shock absorber comprising an air tight cylinder, a piston in said cylinder, a piston rod carrying said piston and valve mechanism mounted on said piston rod for establishing communication between the spaces on opposite sides of said piston at the initiation of movement of said piston in either direction and breaking communication between said spaces after a slight movement of said piston has occurred.

4. A shock absorber comprising an air tight cylinder, a piston in said cylinder, a piston rod carrying said piston and valve mechanism mounted on said piston rod for establishing communication between the spaces on opposite sides of said piston at the initiation of movement of said piston in either direction, said mechanism being mounted for limited movement relative to said rod so as to break communication between said spaces upon substantial movement of said piston.

5. A shock absorber comprising an air tight cylinder, a piston in said cylinder, a piston rod carrying said piston and valve mechanism mounted on said piston rod, said valve mechanism being so mounted as to equalize the pressure on opposite sides of said piston after said piston has begun its movement in either direction and to confine the air in the space forwardly of said piston upon further movement thereof to compress the same.

6. A shock absorber comprising an air tight cylinder, a piston in said cylinder, a piston rod carrying said piston and valve mechanism mounted on said piston rod, ports in said valve mechanism and ports in said rod adapted to register with the ports in said valve mechanism to establish communication between the spaces on opposite sides of said piston upon relative movement of said valve and rod in either direction.

7. A shock absorber comprising an air tight cylinder, a piston in said cylinder, a hollow piston rod carrying said piston and valve mechanism mounted on said piston rod for limited movement thereon, ports in said valve mechanism and ports in said rod adapted to register with the ports in said valve mechanism to establish communication between the spaces on opposite sides of said piston for a limited period of time as said valve mechanism moves along on said rod.

8. A shock absorber comprising an air tight cylinder, a piston in said cylinder, a hollow piston rod carrying said piston and a hollow valve member mounted on said piston rod, said rod and said valve member being open to the spaces on opposite sides of said piston, and ports in said valve member and in said rod adapted to register to establish communication between the spaces on opposite sides of said piston for a brief period of time upon movement of the piston in either direction.

9. A shock absorber comprising an air tight cylinder, a piston in said cylinder, a hollow piston rod carrying said piston and a hollow valve member mounted on said piston rod, said rod and said valve member being open to the spaces on opposite sides of said piston, and ports in said valve member and in said rod adapted to register to establish communication between the spaces on opposite sides of said piston, said valve member having a limited movement on said rod.

10. A shock absorber comprising an air tight cylinder, a piston in said cylinder, a hollow piston rod carrying said piston and a hollow valve member mounted on said piston rod, said rod and said valve member being open to the spaces on opposite sides of said piston, and ports in said valve member and in said rod adapted to register to establish communication between the spaces on opposite sides of said piston, said valve member having a limited movement on said rod and frictionally engaging with the inner face of said cylinder.

In witness whereof, I hereunto subscribe my name this 5th day of January A. D., 1922.

JOHN M. SWANSTROM.